(12) United States Patent
Goldman et al.

(10) Patent No.: US 7,511,654 B1
(45) Date of Patent: Mar. 31, 2009

(54) SYSTEMS AND METHODS FOR MINE DETECTION

(75) Inventors: Geoffrey H. Goldman, Ellicott City, MD (US); Marc A. Ressler, College Park, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 312 days.

(21) Appl. No.: 11/330,111

(22) Filed: Jan. 12, 2006

(51) Int. Cl.
*G01S 13/88* (2006.01)
*G01S 13/89* (2006.01)

(52) U.S. Cl. ............................ 342/22; 342/27; 342/90; 342/179

(58) Field of Classification Search ................ 342/22, 342/27, 90, 179
See application file for complete search history.

(56) References Cited

U.S. PATENT DOCUMENTS

| | | | | |
|---|---|---|---|---|
| 3,900,878 A | * | 8/1975 | Tsao | 340/854.5 |
| 4,430,653 A | * | 2/1984 | Coon et al. | 342/22 |
| 4,687,445 A | | 8/1987 | Williams | |
| 4,884,847 A | * | 12/1989 | Bessinger et al. | 299/1.05 |
| 5,592,170 A | | 1/1997 | Price | |
| 5,673,050 A | | 9/1997 | Moussally | |
| 5,844,159 A | | 12/1998 | Posseme | |
| 6,055,214 A | * | 4/2000 | Wilk | 367/99 |
| 6,154,179 A | | 11/2000 | Kohno | |
| 6,216,540 B1 | * | 4/2001 | Nelson et al. | 73/633 |
| 6,536,553 B1 | | 3/2003 | Scanlon | |
| 6,700,526 B2 | | 3/2004 | Witten | |
| 6,744,253 B2 | * | 6/2004 | Stolarczyk | 324/334 |
| 2002/0185906 A1 | * | 12/2002 | Stolarczyk | 299/4 |
| 2003/0062902 A1 | * | 4/2003 | Stolarczyk | 324/334 |
| 2003/0063014 A1 | * | 4/2003 | Stolarczyk | 340/853.5 |
| 2003/0075327 A1 | * | 4/2003 | Stolarczyk | 166/298 |
| 2003/0107511 A1 | * | 6/2003 | Stolarczyk et al. | 342/22 |
| 2003/0136249 A1 | * | 7/2003 | Inoue et al. | 89/1.13 |
| 2004/0046572 A1 | * | 3/2004 | Champion et al. | 324/637 |
| 2004/0059508 A1 | * | 3/2004 | Champion | 702/2 |
| 2006/0284758 A1 | * | 12/2006 | Stilwell et al. | 342/22 |
| 2007/0273390 A1 | * | 11/2007 | Champion et al. | 324/639 |

OTHER PUBLICATIONS

"A space marching inversion algorithm for pulsed borehole radar in the time-domain", Yongmin Zhang: Ce Liy Geoscience and Remote Sensing, IEEE Transactions on vol. 33, Issue 3, May 1995 pp. 541-550.*

"Super-resolution imaging for point reflectors near transmitting and receiving array", Miwa, T.; Arai, I. Antennas and Propagation, IEEE Transactions on vol. 52, Issue 1, Jan. 2004 pp. 220-229.*

(Continued)

*Primary Examiner*—John B Sotomayor
(74) *Attorney, Agent, or Firm*—William V. Adams; Lawrence E. Anderson (57) ABSTRACT

Systems, methods, and devices for detecting land mines and unexploded ordnance are disclosed. A first embodiment may be construed as a method that includes: inserting an antenna into the ground; transmitting an electromagnetic signal into the ground via the antenna; receiving a response via the antenna; and processing the response to generate an image which can be examined to determine whether a mine exists within proximity of the antenna.

19 Claims, 4 Drawing Sheets

OTHER PUBLICATIONS

Ultra-wideband Synthetic Aperture Radar for Mine-field Detection, by Carin, et al, IEEE Ant. Prop. Mag. vol. 41, pp. 18-33, Feb. 1999.

"Time Domain Sensing of Targets Buried Under a General Rough Alt-Ground Interface," SPIE, v. 4038, pp. 942-953 Apr. 2000.

Dual Hidden Markov Model Characterization of Wavelet Coefficients From Multi-Aspect scattering Data, by Dasgupta, et al., SPIE, v. 4038, pp. 954-965, Apr. 2000.

Detection of Symmetrical Objects Using the Blstatic Multipolarimetric Reverse-time Migration Imaging Technique, by Beh, et al., SPIE, v. 4038, pp. 1019-1027, Apr. 2000.

Combined High-dimensional Analysis of Variance (HANOVA) and Sequential Probability Ratio Test (SPRT) to Detect Buried Mines, Xu, et al. , Proceedings of SPIE vol. 4038 (2000) pp. 1037-1046.

Landmine Detection Research Pushes Forward, Despite Challanges, by Schreiner, et al., Intelligent Systems, IEEE vol. 17, Issue 2, Mar.-Apr. 2002, p. 4-7.

Development Status of the Army's New Handheld Mine Detection Systems, (HSTAMIDS), by Amazeen, et al., Second International Conference on the (IEEE Conf. Publ. No. 458) Oct. 1998, pp. 193-197.

Impact of Interfacial Dipole Radiation on UXO target Detection Using 3-D Kirchoff Imaging, by Moran, et al., Geoscience and Remote Sensing Symposium, 2000, Proceedings, IGARSS 2000, IEEE 2000 International, vol. 4, 24-28, Jul. 2000, pp. 1421-1423.

Adaptive Fuzzy Force Control of an Anti-Personal (AP) Mine Detector Robot, by Shahri, et al., IEEE Canadian Conference on Electrical and Computer Engineering, May 2001, pp. 99-104.

Electromagnetic Analysis of an Antenna Buried in a Composite Environment, by Pasvolsk, et al., Antennas and Propagation Society, 1999, IEEE International Symposium 1999, vol. 2, 11-16, Jul. 1999, pp. 854-857, vol. 2.

Complex Rays with an Application to Gaussian Beams, by Keller, et al., J. Opt. Soc. of American Jan. 1971, V. 61, pp. 40-43.

Complex-source-point Solutions of the Field Equations and Their Relation to the Propagation and Scattering of Gaussian Beams, by Felsen, Symp. Matermat. Ins. Naz. De Alta Matematica, V. 18, pp. 39-56, London: Academic, 1976.

Home page of Avtech Electrosystems Ltd.; http://www.avtechpulse.com dated Jan. 8, 2006.

* cited by examiner

SYSTEMS AND METHODS FOR MINE DETECTION

GOVERNMENT INTEREST

The invention described herein may be manufactured, used, and licensed by or for the United States Government.

BACKGROUND

1. Technical Field

The present invention relates to the field of mine detection and, in particular, to electromagnetic sub-surface mine detection.

2. Description of the Related Art

According to the International Committee of the Red Cross and Red Crescent Societies (ICRC), there are approximately 110 million land mines scattered around the world in 64 countries. It is estimated that 26,000 people a year are victims of land mines. Great efforts have been made in clearing these mines. In doing so, for every 5000 mines cleared, an average of one mine clearer is killed.

Because of these startling statistics, constant research is underway to improve the techniques used to clear mines. There are a variety of technologies that are available for detecting mines. Some standard approaches to detecting mines (and also unexploded ordnance, "UXOs") are ground penetrating radar (GPR), infrared (IR) thermal imaging quadrupole resonance sensors (QRS), electromagnetic induction (EMI), and neutron interrogation. However, new anti-personnel mines are being enclosed in plastic cases that are more difficult to locate and distinguish from rocks, roots, and other clutter using electromagnetic sensors than were the previously used metal cases.

Another common technique to locate mines is to generate synthetic aperture radar (SAR) imagery of the ground using an ultrawideband (UWB) radar of a plane or unmanned aerial vehicle (UAV). However, to obtain acceptable probabilities of detection, the detection threshold is typically set quite low, resulting in frequent false-positives.

SUMMARY

Systems and methods for detecting explosive devices such as unexploded ordnance and land mines are provided. In this regard, an embodiment of a method includes: inserting an antenna into the ground; transmitting an electromagnetic signal into the ground via the antenna; receiving a response via the antenna; and processing the response to generate an image which can be examined to determine whether an explosive device exists within proximity of the antenna.

Another embodiment of a system for detecting explosive devices includes an antenna to be placed into the ground at a predetermined depth and at predetermined locations in the ground. The system also includes a transmitter coupled to the antenna for initiating an electromagnetic signal to be propagated through the ground via the antenna, and a receiver coupled to the antenna for receiving backscattered radiation as a result of the transmitted electromagnetic signal. A signal processor is coupled to the receiver for processing the backscattered radiation. The system also includes an imaging device for displaying a visual rendering of the information from the backscattered radiation received by the receiver.

Other devices, systems, methods, features and/or advantages will be or may become apparent to one with skill in the art upon examination of the following drawings and detailed description. It is intended that all such additional devices, systems, methods, features and/or advantages be included within this description.

BRIEF DESCRIPTION OF THE DRAWINGS

Many aspects of the disclosure can be better understood with reference to the following drawings. Note, the components in the drawings are not necessarily to scale. Also, like reference numerals designate corresponding parts throughout the several views.

DETAILED DESCRIPTION

As will be described in detail here, systems, methods and devices to detect explosive devices, such as UXO and mines, are provided. Some of these embodiments can provide estimated land mine locations and can probe the surrounding areas to verify the locations. This can be done by hand or by means of a robotic device, either remotely controlled or pre-programmed to function in a particular manner.

Figure 1:
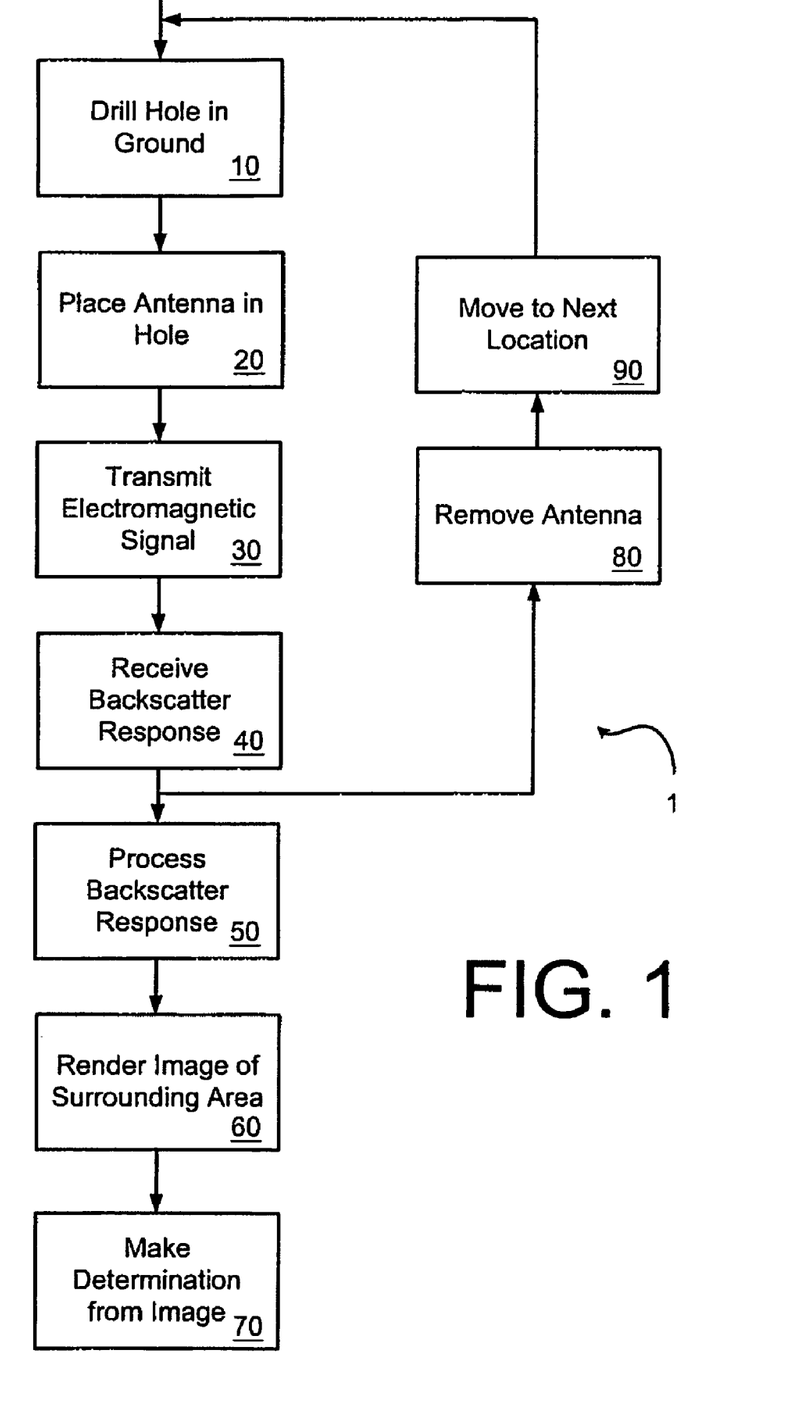
FIG. 1 is a flow chart of an embodiment of a method for mine detection.

FIG. 1 illustrates a flow chart of an embodiment of a method 1. The first step is to place an antenna in the ground (step 20), or alternatively, in a hole just dug (to be discussed shortly). The length of such an antenna is generally a function of the type of antenna (e.g., quarter-wave monopole, half-wave dipole, etc.) and the wavelength of the signal to be propagated by the antenna.

The wavelength of the signal to be propagated by the antenna is a function of the frequency of the signal and estimated dielectric constant of the ground, as is well known in the art. Preferably, a signal composed of a defined frequency spectrum will be propagated by the antenna. The maximum transmit frequency of interest, or equivalently, the minimum wavelength, should be considered when determining the depth at which the antenna is placed into the ground. For example, for a maximum transmit frequency of 1 GHz and for a dielectric constant ($\in$) of 4, the antenna should be placed approximately 3.75 cm into the ground.

$$\frac{\lambda_{min}}{4} = \frac{c}{4 f_{max} \sqrt{\varepsilon}} \qquad \text{Eq. 1}$$

The dielectric constant of the ground can be estimated from the resonant frequency of the antenna, which can be estimated by monitoring the ringing in the transmit pulse. By performing a fast Fourier transform (FFT) on time measurements of the leakage signal then observing the location of the peak value, the resonant frequency of the antenna and the local dielectric constant can be estimated using $\in = (c/4fL)^2$ where L is the length of the monopole. A more accurate estimate of the dielectric constants can be obtained by iteratively adjusting dielectric values so that the ground truth locations of the holes used to insert the antenna correspond to their locations in the SAR imagery.

In some alternative embodiments, a hole will need to be dug, or drilled, to provide for placement of the antenna into the ground (step 10). The depth of the hole is dictated by the length of the antenna.

A desired electromagnetic signal generated with an impulse radar is then transmitted into the ground, via the antenna (step 30). The ideal frequency spectrum of the transmitted pulse is determined by the antenna, dielectric constant of the ground, and bandwidth. A typical desired spectrum of the transmitted pulse is 250-1000 MHz, which also accounts for variation in ground attenuation, antenna efficiency, and antenna impedance matching. For a UWB signal, the signal shape input to the antenna will not be the signal shape transmitted. The transmitted signal shape will be the derivative of the input signal, which often leads to lost power. For example, a square shaped pulse would have a derivative input signal of two impulses at the edges and all the power between them lost. To minimize this effect, a short monocycle electromagnetic pulse can be used. Monocycle pulses that are approximately 1 ns in duration can be achieved using low power UWB transmitters for communication. The approximate shape and frequency content of the transmitted pulse can be analytically determined from the input signal and configuration of the antenna. Large integration gain can be achieved by making multiple measurements at each position. For example, a transmitter with a pulse repetition frequency (PRF) of 1 MHz results in a signal processing gain of 60 dB for an integration time of 1 second.

These signals, however, will be attenuated by the ground, depending upon the dielectric constant, loss tangent, and frequency. Typical attenuation is between 5-10 dB/m for dry ground and between 15-30 dB/m for wet ground for frequencies between 250-1000 MHz. For wet ground, the losses are typically too great for imaging. For dry ground, the losses are acceptable for targets at short ranges.

Once transmitted, the next step is to receive the backscattered response signals (step 40). Once received, the response signals can be processed (step 50) using a variety of possible signal processing techniques employed to generate SAR imagery. The backscattered response signals are amplified and sampled with a high-speed analog-to-digital converter (ADC). To limit the required acquisition speed of the ADC, the pulses can be transmitted with a staggered start time with respect to the clock on the ADC. The start time should be staggered in time increments equal to the time interval between ADC samples divided by M, where M is the effective increase in the sample rate of the ADC. The data will be sampled continuously over a selected time interval or equivalently, range. Next, the ADC samples are reordered to generate 1-dimensional high-range resolution (HRR) profiles of the terrain. Then, multiple HRR profiles are averaged together to improve the signal-to-noise ratio (SNR). A Hilbert transform can be performed to obtain an analytic signal with complex data.

High-resolution imagery can be obtained using back-projection techniques calculated in either the time or frequency domain. Since an impulse radar is being deployed, generating imagery in the time domain is easier. However, if frequency dependent adjustments in the dielectric constant are desired for improved accuracy, then the processing should be performed in the frequency domain.

$$g(x, y, z) = \sum_{k} W_k\left(\frac{d_k(x, y, z)}{2c/\sqrt{\varepsilon_r}}\right) \quad \text{Eq. 2}$$

where g(x,y,z) is an estimate of the amplitude of the scattering center at location (x,y,z), $W_k(\tau)$ is the value of the integrated HRR profile interpolated at time $\tau$, $d_k(x, y, z)$ is the distance from the grid coordinate (x, y, z) to the borehole location (see equation 2), c is the speed of light in free space, and $\varepsilon_r$ is the real average dielectric constant of the soil. The distance from the desired grid point to the borehole is computed using equation 3

$$d_k(x,y,z) = ((R_{kx}-x)^2 + (R_{ky}-y)^2 + (R_{kz}-z)^2)^{1/2} \quad \text{Eq. 3}$$

where k is the borehole number, (x,y,z) is the grid point of interest, and R is a 3-d vector describing the location of the kth borehole. To improve the signal-to-noise ratio (SNR), the downrange dimension of the image can be correlated with a matched filter (MF) response from the target. However, in general, the MF response is not known, so this step can be skipped. From there, an image can be rendered with the processed signals (step 60).

Imaging can also be computed in the frequency domain. First, the HRR profiles are delayed in time to account for any deviation in distance from where the antenna was inserted to the desired location using interpolation. Next, an FET is performed on the HRR profiles to generate a frequency response. Now, if desired, the effect of a frequency dependent dielectric constant can be compensated for a single location by multiplying the measured frequency response by the complex conjugate of the estimated effect of the dielectric constant on the phase. The correction factor for the dielectric constant can be estimated from apriori knowledge about the soil type at a particular location. This procedure can be used to remove higher order terms that defocus the image and can be repeated for several locations. Next, image formation can be performed using a back-projection technique.

Due to the unknown dielectric constant of the ground, the exact range to the target cannot be computed from a single image. To overcome this limitation, two images may be generated at different aspect angles. The regions in the images can be registered by correlating the statistical properties of small subsets of the two images. For example, the determinate of the covariance matrix computed over several subsets of the image can be correlated. Since the range of each synthetic aperture is known, the actual range to the region of interest can be determined by triangulation. Once the images are co-registered over a region of interest (ROI), they can be combined by linear interpolation and noncoherent averaging. For better resolution, the dielectric constant that co-registered the images can be fed back to the imaging algorithm and used to reprocess the data.

Automatic detection and identification algorithms can be applied to the final image. Detection and discrimination algorithms have been extensively researched for SAR imagery based on above-ground UWB radar systems. Such detection and discrimination algorithms are not only well known, but highly diverse, as this is an area of great interest to the community involved in remediating areas in which there are land mines or other unexploded ordnance. For example, the following papers were presented at the 2000 SPIE AeroSense Conference in the annual conference session titled Detection and Remediation Technologies for Mines and Minelike Targets V in which techniques for discriminating the differences between radar signatures for mines, unexploded ordnance, pipes, barrels, and other buried clutter objects are regularly presented:

- Dogaru and Carin "Time-Domain Sensing of Targets Buried Under a General Rough Air-Ground Interface" SPIE, v. 4038, pp. 942-953, APR 2000;
- Dasgupta, et al. "Dual Hidden Markov Model Characterization of Wavelet Coefficients From Multi-Aspect Scattering Data" SPIE, vol. 4038, pp. 954-965, APR 2000;
- Beh, et al. "Detection of Symmetrical Objects Using the Bistatic Multipolarimetric Reverse-time Migration Imaging Technique", SPIE, v. 4038, pp. 1019-1027, APR 2000; and
- Xu, et al. "Combined High-dimensional Analysis of Variance (HANOVA) and Sequential Probability Ratio Test (SPRT) to Detect Buried Mines.

In addition, this topical area is regularly reported on in various scientific journal articles. An example of this is an article Army Research Laboratory coauthored: Carin, et al. "Ultra-wideband Synthetic Aperture Radar for Mine-field Detection", IEEE Ant. Prop. Mag, vol. 41, pp. 18-33, FEB 1999

The foregoing articles and each of the following patents related to methods of automatically detecting or identifying subterranean targets: "Method and apparatus for identifying buried objects using ground penetrating radar" Witten, U.S. Pat. No. 6,700,526; "Three-dimensional underground imaging radar system" Moussally, et al., U.S. Pat. No. 5,673,050; and "Radar system and method for detecting and discriminating targets from a safe distance" Price, et al., U.S. Pat. No. 5,592,170 are incorporated herein by reference in their entirety for all that they disclose.

The results obtained, as reported in the articles and patents discussed above, can be leveraged and applied to SAR imagery generated with subsurface antennas. For example, several mine image templates and/or UXO templates at various aspect angles can be correlated with the processed imagery. The magnitude of the correlated images relative to an adaptive threshold can be used to detect targets and a template corresponding to the peak value can be used to identify the target. Upon completion, results can be reviewed, such as by a trained technician, and a determination can be made as to whether a target exists in the prescribed location (step 70). Once the response signals are received, the antenna can be removed from the ground (step 80) and moved to the next location (step 90). The process may be repeated until the desired area has been fully examined.

Figure 2:
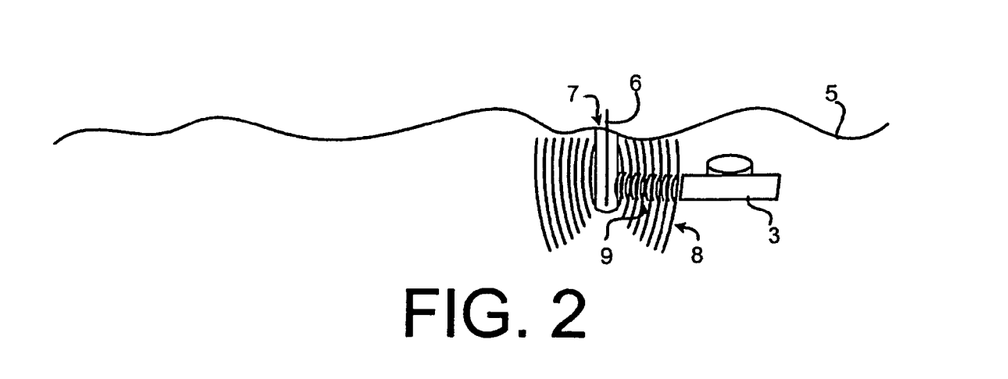
FIG. 2 is a diagram of representative electromagnetic activity occurring below the surface during mine detection.

FIG. 2 is a diagram of representative electromagnetic activity occurring below the surface 5 during mine detection. An antenna 6 is placed in the ground at a particular location. The antenna 6 can be placed in the ground directly or inside a hole 7 cut out of the ground prior to placement. In the preferred embodiment, the antenna 6 is placed normal the surface 5, but the invention is not limited as such. The antenna 6 could be placed at any particular angle relative to the normal, and will most likely be a matter of the shape and size of the antenna 6 utilized.

Figures 4, 5:
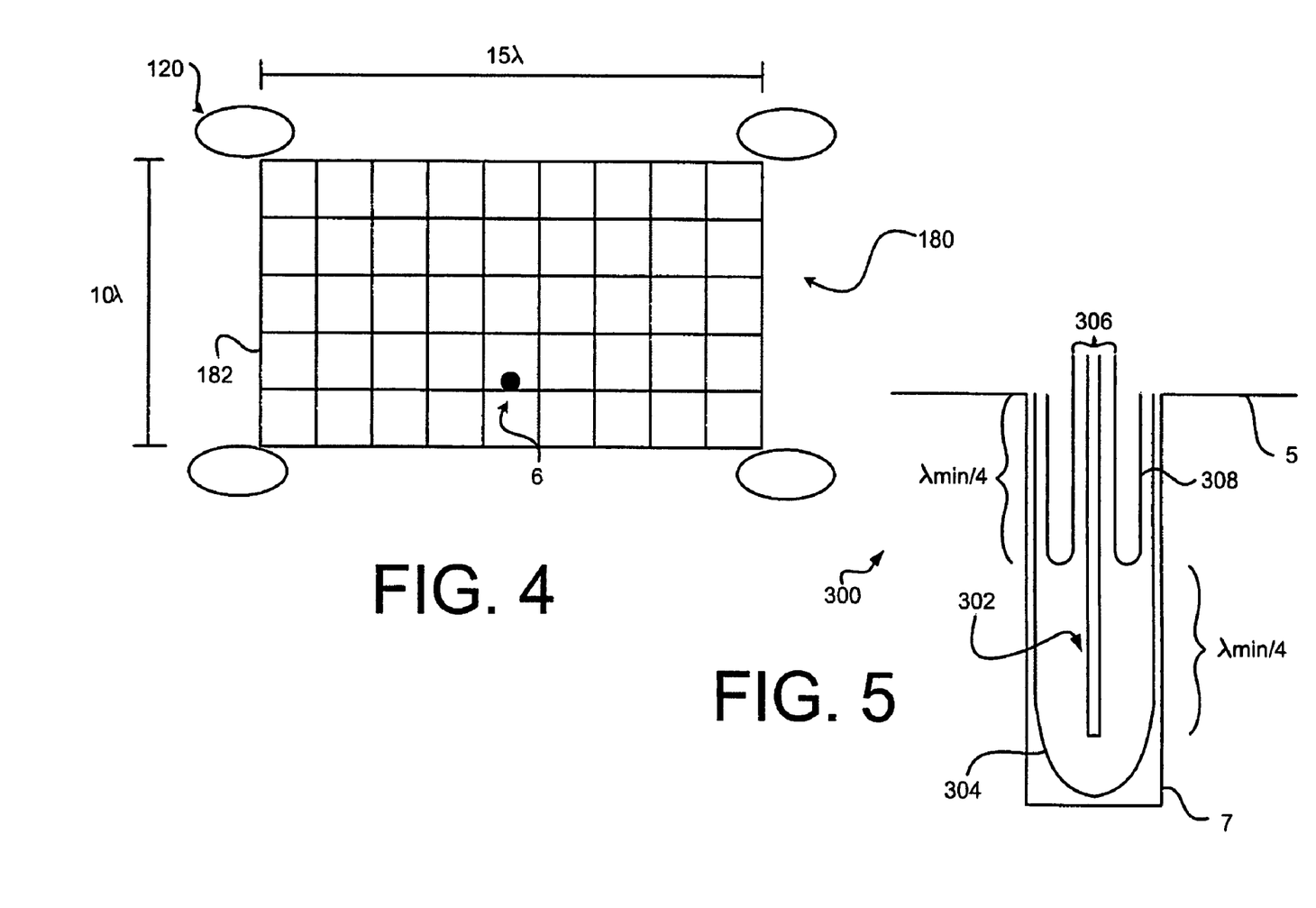
FIG. 4 illustrates a ground plane for an embodiment of a monopole antenna.
FIG. 5 illustrates an embodiment of a dipole antenna.

As illustrated in FIG. 2, the antenna 6 is a monopole antenna. Other antenna shapes could easily be substituted, resulting in different radiation patterns. For example, a half-wave dipole or a quarter-wave monopole with an above ground conducting plane could be utilized to mimic a half-wave dipole. Furthermore, non-mast shaped antennas, such as loop antennas and the like, could be utilized. The length of a quarter-wave monopole antenna to be inserted into the ground is approximately $\lambda_{min}/4$. A ground plane 180 as shown in FIG. 4 is a wire mesh 182 that will be lowered to the ground at each hole. The size of the ground plane 180 is about $10 \times 15 \lambda_{min}$ with the position of the antenna 6 offset to the side of the mesh 182 to generate a directional beam pattern.

A transmitted signal 8 is reflected 9 off of a mine 3, and propagates back through the ground to the antenna 6, which now serves as a receive antenna. Many other reflected signals will be received by the antenna 6, which are all a factor of the size, shape, and material composition of various objects, and the distance those various objects are from the antenna 6. Collectively, the received reflections 9 can be processed by a signal processor and the information eventually viewed on a device, whereby an automatic detection and identification algorithm and/or a trained technician can determine what, if anything, is buried below the surface.

It is not out of the scope of the present invention that an array of antennas be placed in the ground. For example, a one-dimensional array of quarter-wave monopoles may be placed in the ground at a given separation and a radar signal generated and propagated through the antennas. An antenna array varies the radiation pattern of the radar signal. Alternatively, if positioned far enough apart from each other such that they do not have any effect on each other, an antenna array may cut down the work necessary. It is also not out of the scope of the present invention to place two or more antennas in the ground, one or more of which are transmit antennas and others are receive antennas.

Figure 3:
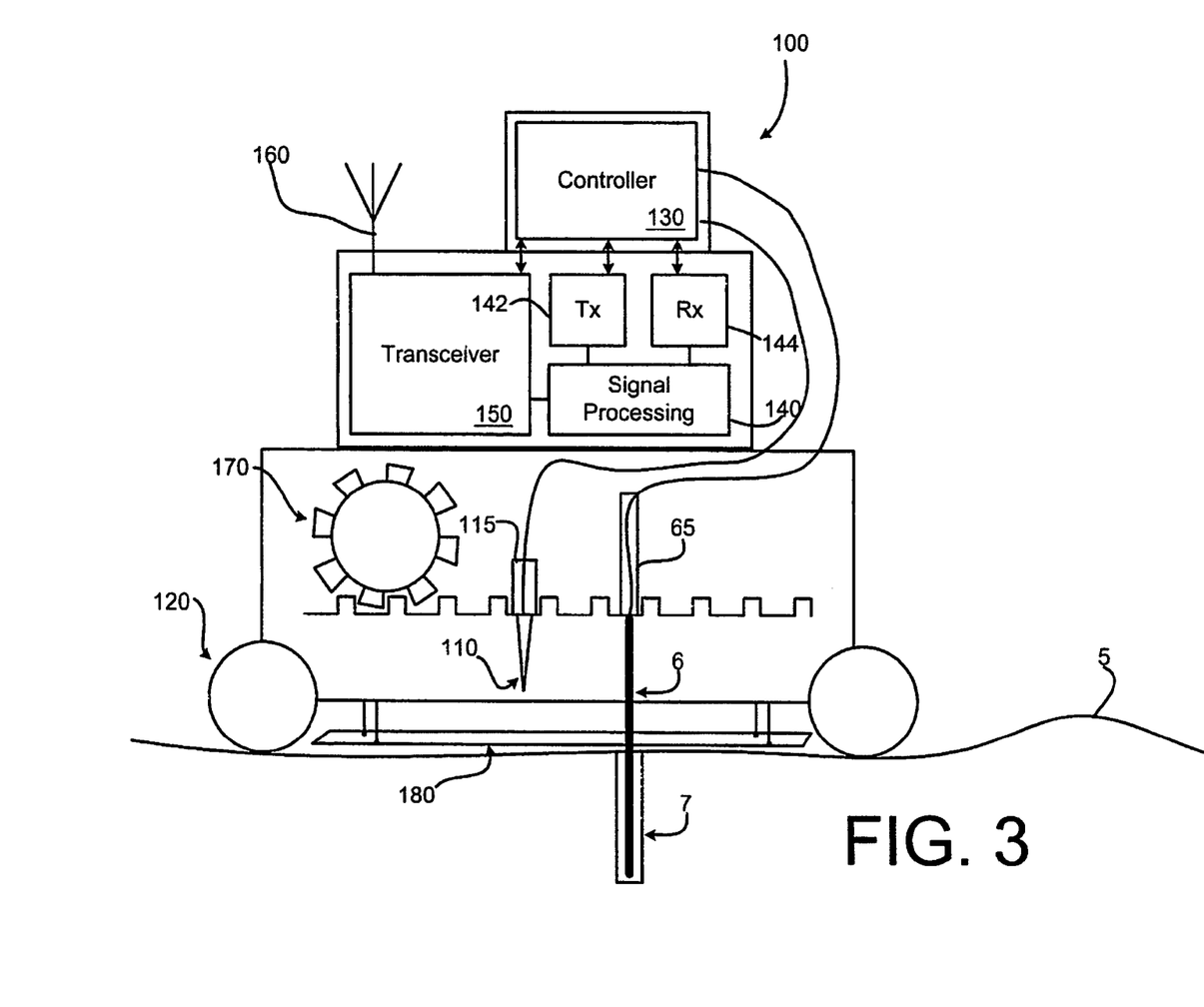
FIG. 3 illustrates an embodiment of a robotic device.

FIG. 3 illustrates a robotic device 100 that may be utilized to carry out the novel method described in FIG. 1. The robotic device 100 includes the necessary hardware and software to perform various functions, such as movement, communication relay, and possibly signal processing of the reflection signals received by the antenna 6. The robotic device 100 may be remotely controlled or may be pre-programmed to perform particular operations, such as moving in a particular pattern.

The robotic device 100 further includes the necessary mechanical and electrical components 120 to move along the ground 5.

The robotic device 100 also includes a digging aperture 115 that can be moved by the robotic device 100 on command. At the end of the digging aperture 115 would be a digging instrument 110. In the preferred embodiment, this would be some type of drill to dig a hole in the ground. An antenna aperture 65 can be moved around and configured to place the antenna 6 in the ground, either directly, or into a hole dug by the digging instrument 110. Illustrated is a simple rack and pinion system 170 that could be utilized to move the drill and antenna as is known in the art. This is merely an example method for moving such devices. Certainly, other methods could be utilized.

In the case where the antenna 6 is a monopole antenna, a ground plane 180 may be provided simply by lowering a wire mesh to the ground. FIG. 4 illustrates a top view of the wire mesh ground plane and antenna.

A controller 130 is included in the robotic device 100 to house the necessary hardware and software to operate the robotic device 100. A signal processing block 140 may be housed in the robotic device 100. The signal processing block 140 can process the received signals from the antenna 6 into digital data that can be used for displaying processed information. The signal processing block 140 includes the hardware and software to process the signals with a number of possible signal processing techniques.

A transmitter 142 can generate and transmit the radar signal to be radiated from the antenna 6. A receiver 144 receives the response signal and passes this along to the signal processor 140.

The signal processor 140 will generate high-resolution imagery using backprojection techniques in either the time or frequency domain. Processing in the time domain is less be used for imaging can be communicated back to a remote location and control instructions may be received by the transceiver 150 to control the robotic device 100. Certainly a wired interface with a remote location is feasible. It is also feasible to exclude the signal processing 140 from the robotic device 100 and house it remotely. In this situation, the signals received by the antenna 6 would be communicated to the remote location for processing.

FIG. 5 illustrates an embodiment of a dipole antenna structure 300 in accordance with embodiments of the present invention. Similar to other embodiments, a hole 7 may optionally be drilled, or dug, in the ground 5. In the case of a dipole antenna, the hole 7 needs to be twice the depth needed for a monopole antenna.

A coaxial cable 306 can be used to serve as the dipole antenna. The coaxial cable 306 includes a central conductor 302 that serves as the mast antenna. The central conductor 302 is positioned approximately $\lambda_{min}/2$ below the surface of the ground 5. The outer conductor 308 of the coaxial can be pulled back in a manner that exposes $\lambda_{min}/4$ of the central conductor 302. Thus, $\lambda_{min}/4$ of the outer conductor 308 can be rolled back and positioned as illustrated. Configured in such a manner, the outer conductor 308 serves as a conducting plane.

The coaxial cable 306 may be configured as described and then positioned within a dielectric sheath 304 which serves to protect the central conductor 302. The dielectric sheath 304 may be a plastic casing that is molded into a preferable shape such that it is easy to place in the ground 5. As mentioned, in some instances in practicing the invention a hole may not be drilled prior to placing the antenna. In this case, the dielectric sheath 304 should be shaped such that it may be forced into the ground. In embodiments where a hole is drilled beforehand, this shaping will not be necessary.

Figure 6:
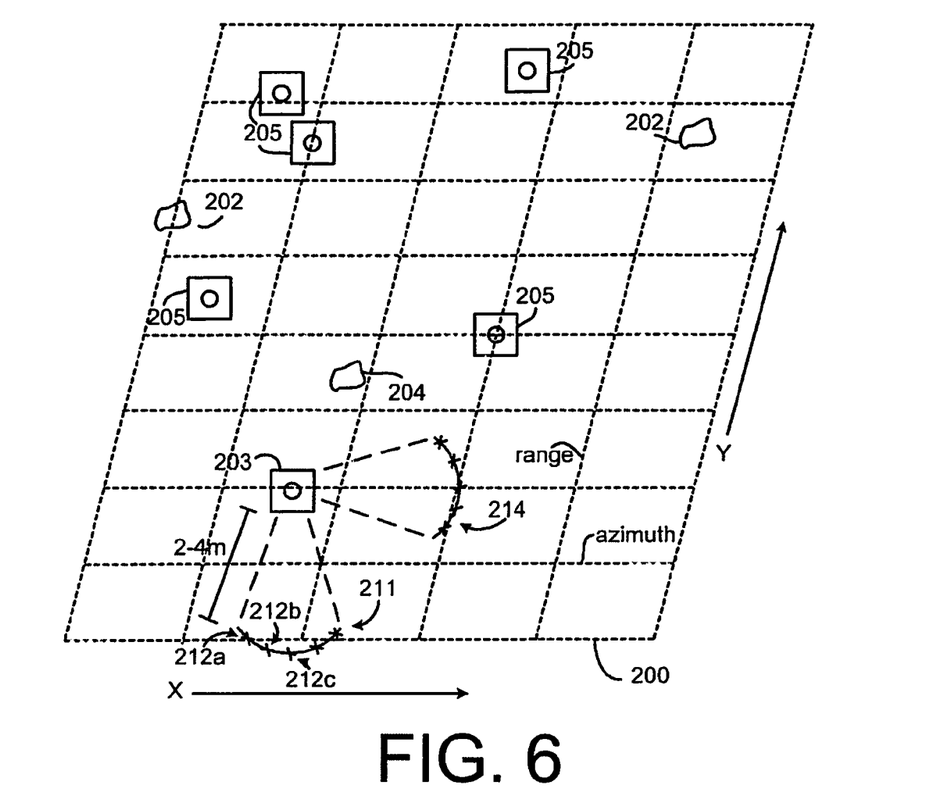
FIG. 6 illustrates an embodiment of an interrogation pattern.

FIG. 6 is a diagram attempting to illustrate a possible interrogation pattern of a suspected mine. Initially, a UWB SAR image will be generated from a plane overhead and a mine detection algorithm will be applied. Consider an airborne UWB SAR imaging 200 perpendicular to the aircraft velocity, where the aircraft is moving in the x-direction. Typically, UWB SAR imaging produces a two-dimensional (2-D) image 200. One dimension in the image 200 is called down-range and is a measure of the "line-of-sight" distance from the radar to the target. Range measurement and resolution are achieved in SAR by using a high bandwidth signal. The other dimension is called the azimuth (or cross-track) and is perpendicular to the direction of flight. It is the ability of SAR to produce relatively fine azimuth resolution that differentiates it from other radars.

Resulting from the SAR image 200 are potential locations of mines 205, unexploded ordnance (UXO), and, unfortunately, rocks 202 and other debris. Once a SAR image 200 is generated for a given area, personnel can move in to defuze the mines. With plastic-encased mines, it is difficult to distinguish between a mine and a rock from the SAR image 200. Accordingly, verification of all the potential locations is necessary. This becomes very cumbersome and time consuming when rocks are prevalent in the surrounding terrain. The present invention provides a system and method for verifying the results of the SAR image 200, by determining on the ground whether a suspicious object is in fact a mine or simply just debris.

The method described in FIG. 1 is best executed in a preferred pattern. In the diagram illustrated in FIG. 6, a two-dimensional area SAR image 200 can be verified by performing the preferred method in an arc-like fashion, or alternatively in a straight-line approach. A high resolution 3-d image can be generated by measuring several closely spaced arc trajectories together and generating imagery using the same processing techniques, but on a 3-d grid instead of a 2-d grid.

The location of a list of potential mines 205 will be transmitted to a robotic vehicle and/or a technician through an RF link. The robotic vehicle in accordance with embodiments of the present invention may then be placed near the potential mine 203. Next, the robotic vehicle will autonomously navigate to a distance of approximately 2-3 meters from the mine 203. The robotic vehicle will drive around the suspected mine 3 in a first arc 211 of approximately 45 degrees with a radius of curvature of 2-3 meters as shown in FIG. 6. Since the antenna pattern is broad, using an arc trajectory rather than a line trajectory will reduce the response of potentially ambiguous scatterers. Holes 212a-c will be drilled with a separation of approximately $\lambda_{min}/2$ along the arc. A second set of arcs 214 located approximately 45 degrees from the first set of arcs 211 with respect to the suspected location of the mine 203 will also be drilled as shown in FIG. 6.

Once a hole is drilled, an antenna may then be placed in the hole. Multiple holes may be drilled together prior to placing one or multiple antennas, which would form an antenna array. Illustrated in FIG. 6 is just one possible interrogation pattern. Any other pattern could be utilized and subsequently programmed into the robotic vehicle, if so equipped.

It should be emphasized that many variations and modifications may be made to the above-described embodiments. Further, the methods and devices embodying the present invention can be used as stand-alone detection techniques or in combination with other techniques. For example, prior to performing above-described embodiments, another sensor, such as an above ground UWB radar with SAR capability, could provide GPS coordinates of potential land mines. A particular examination pattern may be created and marked, or may be programmed into a robotic device an embodiments of the invention could be performed accordingly. All such modifications and variations are intended to be included herein within the scope of this disclosure and protected by the following claims.

What is claimed is:

1. A method for detecting subterranean explosive devices, the method comprising:
   inserting an antenna into the ground;
   transmitting an electromagnetic signal into the ground via the antenna;
   receiving a response via the antenna; and
   processing the received response to generate an image which can be examined to determine whether an explosive device exists within the proximity of the antenna.

2. The method of claim 1, further comprising the step of digging a hole in the ground for insertion of the antenna.

3. The method of claim 2, wherein the step of digging further comprises drilling a hole in the ground for insertion of the antenna.

4. The method of claim 3, wherein the step of drilling a hole in the ground comprises drilling a hole with a depth of approximately $\lambda_{min}/4$, wherein $\lambda_{min}$ is the minimum wavelength of the transmitted electromagnetic signal for the estimated dielectric constant of the soil.

5. The method of claim 1, wherein the transmitted electromagnetic signal is in the frequency range of 250 to approximately 1000 MHz.

6. The method of claim 1, wherein the step of processing the received response comprises:
    performing a synthetic aperture radar (SAR) technique.

7. The method of claim 1, wherein the step of processing the received response comprises:
    performing a backprojection technique.

8. The method of claim 1, wherein the inserting, transmitting, and receiving is performed at a first location, and further comprising:
    moving to at least one additional location; and
    performing the inserting, transmitting, and receiving steps at the at least one additional location.

9. The method of claim 8, wherein the second location's distance is about $\lambda_{min}/2$ from the first location.

10. The method of claim 8, wherein the step of moving to at least one additional location comprises moving sequentially to a plurality of additional locations in a predetermined pattern; and
    further comprising repeating the inserting, transmitting, and receiving at each additional location.

11. The method of claim 8, further comprising:
    enabling a robot to insert the antenna into the ground.

12. The method of claim 11, further comprising:
    enabling the robot to move a given distance in a given direction.

13. A system for detecting unexploded ordnance (UXO), including land mines, the system comprising:
    an antenna to be placed into the ground at a predetermined depth and at predetermined locations in the ground;
    a transmitter coupled to the antenna for initiating an electromagnetic signal to be propagated through the ground via the antenna;
    a receiver coupled to the antenna for receiving backscattered radiation as a result of the transmitted electromagnetic signal;
    a signal processor coupled to the receiver for processing the backscattered radiation; and
    an imaging device for displaying a visual rendering of the processed information received by the receiver, whereby a UXO can be detected by either automatic detection and identification algorithms or by viewing the visual rendering displayed.

14. The system of claim 13, further comprising:
    a ground plane coupled with the antenna.

15. The system of claim 13, further comprising:
    a digging instrument for digging a hole for the antenna to be placed in.

16. The system of claim 15, further comprising:
    a robot comprising:
    the digging instrument;
    an aperture for placing the antenna; and
    means for moving the system a given distance in a given direction.

17. The system of claim 16, wherein the robot further comprises:
    the signal processor.

18. The system of claim 17, wherein the robot further comprises:
    means for communicating the processed information to the imaging device.

19. A system for detecting unexploded ordnance in the ground comprising:
    at least one antenna adapted to be placed in the ground;
    a transmitter coupled to the antenna for transmitting radar signals into the ground via the antenna, the frequency of said radar signals being within a range of 250-1000 MHZ;
    a receiver coupled to the antenna for receiving radiation as a result of the transmitted radar signals;
    a signal processor coupled to the receiver for processing the received radiation; and
    an imaging device coupled to the signal processor for displaying a visual representation of an unexploded ordinance.

* * * * *